US006366906B1

(12) United States Patent
Hoffman (10) Patent No.: US 6,366,906 B1
(45) Date of Patent: Apr. 2, 2002

(54) METHOD AND APPARATUS FOR IMPLEMENTING A SEARCH SELECTION TOOL ON A BROWSER (75) Inventor: Richard Dale Hoffman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,951

(22) Filed: Jul. 15, 1999

(51) Int. Cl.[7] .............................................. G06F 17/30
(52) U.S. Cl. ................. 707/3; 707/1; 707/10; 707/103
(58) Field of Search ......................... 707/1, 3, 10, 103

(56) References Cited

U.S. PATENT DOCUMENTS

| 5,815,830 | A |   | 9/1998  | Anthony .................. 707/6    |
| 5,933,841 | A | * | 8/1999  | Schumacher et al. ....... 707/501  |
| 5,950,194 | A | * | 9/1999  | Bennett et al. ............. 707/3  |
| 6,005,565 | A | * | 12/1999 | Legall et al. .............. 345/327 |
| 6,199,099 | B1| * | 3/2001  | Gershman et al. .......... 709/203  |

OTHER PUBLICATIONS

Barrett et al.; Posting Paper on the Web; Dept. of Comput. Sci. Proceedings Vision Interfaces '98, pp. 381–388, 1998.

* cited by examiner

Primary Examiner—Hosain T. Alam
Assistant Examiner—Cam-Y Truong
(74) Attorney, Agent, or Firm—Duke W. Yee; David A. Mims, Jr.; Stephen J. Walder, Jr.

(57) ABSTRACT

Initially, the user sets a series for select search preferences, which defines a select search tool. The preferences relate to the type of search tool being defined by the user, such as a select search engine search, a universal resource locator (URL) extension search or suffix, or a user defined search string. Once created, the select search tool may be placed on the browser button bar as a search button, or it may be incorporated in an existing search button as a search tool in a drop down menu. By selecting a term the user effectively creates pseudo links to the selected term by simultaneously or sequentially searching a term using the predefined select search preferences, thus allowing the user to access resources related to the term in much the same manner as a conventional link.

15 Claims, 9 Drawing Sheets

METHOD AND APPARATUS FOR IMPLEMENTING A SEARCH SELECTION TOOL ON A BROWSER

BACKGROUND OF THE INVENTION

1. Technical Field

The present invention relates to the field of information technology. More particularly, the present invention relates to a means for searching information stored in association with network nodes or web site addresses. Still more particularly, the present invention relates to a method and apparatus for creating a user defined search for certain nodes, links, or web site addresses.

2. Description of Related Art

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." A browser is a program that is executed on a graphical user interface (GUI), which allows a user to read hypertext by means of the GUI. The browser provides some means of viewing the contents of web pages (or nodes) and of navigating from one web page to another.

Examples of browsers for the World-Wide Web (WWW) include: Netscape Navigator from Netscape Communications Corporation, 501 East Middlefield Road, Mountain View, Calif. 94043, U.S.A.; Microsoft Internet Explorer, available from Microsoft Corporation, Redmond, Wash.; and NCSA Mosaic, first available from National Center for Supercomputing Applications in Urbana, Ill., U.S.A. Web browsers act as clients of remote web servers.

The WWW is a massive hypertext system that a computer user accesses using an information access apparatus such as a WWW browser computer application. The WWW browser application communicates with information provider apparatuses, such as WWW server computer applications, to obtain information and services in the form of web pages. These web pages are identified by unique Universal Resource Locators (URL). Typically, a browser application provides bookmark capability for storing URLs for user-selected web pages. This simplifies the user's future access to these bookmarked web pages.

The background of the World Wide Web-WWW browser applications and Uniform Resource Locators-are well described by reference to the first chapter of Instant HTML Web Pages by Wayne Ause, Ziff-Davis Press, ISBN 1-56276-363-6, copyright 1995, pages 1–15, hereby incorporated by reference as illustrative of the prior art. The URL specification, also incorporated by reference, is described in RFC1738 and can be found on the WWW at http://www.cis.ohiostate.edu/htbin/rfc/rfc1738.html.

Although the invention applies to information access and information provider apparatus, WWW browser and WWW server applications are representative of the technology. As such, this application describes the invention within the context of a preferred embodiment utilizing WWW browser and WWW server applications.

As mentioned above, the WWW is a massive hypertext system. Thus, the information provided to a user often includes references to other related information. These references are via hypertext links. Activating these hypertext links often results in accessing completely different web pages (supplied from completely different WWW server applications on other computer systems) from the web page that contains the link. Thus, a user often follows many links to reach desired information or services.

One difficulty when traversing these links is that the user often loses track of the sequence of links used to arrive at a particular web page. Therefore, the user has difficulty returning to a web page of interest. A bookmark facility addresses this problem by providing a mechanism to store and recall specific web pages of interest. Each bookmark comprises the title of the web page and the URL used to access the web page. Additionally, bookmarks often contain the date the web page was last visited, and the date the web page was bookmarked, along with additional information.

Conventional browsers often provide the user with a search tool for searching the Internet for a user defined search term. However, browser search tools are normally links to a designated search engine at a server. The actually searching is performed by at the server rather than being performed as a function of the browser itself. The user may also accesses other resources on the Internet for search tools and specialty tools for finding specific information related to a user defined search term.

One problem with current web page documents is that the pages are inadequately hyperlinked. The author of the web page decides which terms are to be hyperlinked. Another problem is that even if a term is linked, the author again decides which resource to link the term to. Conventionally, links are provided to only a single resource so any additional information needed by the reader must be acquired independently by the reader. This is usually accomplished by designing a search strategy for the term or accessing a specialty resource for the desired information It would be advantageous to provide users with a search tool function on a browser for searching terms on a web page being viewed. It would further be advantageous to provide a user with a configurable search tool for defining a multitude of independent search strategies. It would be even more advantageous to provide the user with a plurality of search tools for simultaneous searching for a term in a web page, using different search configurations. Finally, it would be even more advantageous to provide the user with a means to create pseudo links to a term by defining a plurality of search tools for simultaneous searching for a term in a web page, thereby allowing the user to access related information to the term in much the same manner as a conventional link.

SUMMARY OF THE INVENTION

The present invention discloses a method and apparatus for creating user defined search tools and configuring the tools on a web browser. Initially, the user sets a series of select search preferences, which define a select search tool. The preferences relate to the type of search tool being defined by the user, such as a select search engine search, a universal resource locator (URL) extension search or suffix, or a user defined search string. Once created, the select search tool may be placed on the browser button bar as a search button, or it may be incorporated in an existing search button as a search tool in a drop down menu. By selecting a term, the user effectively creates pseudo links to the selected term by simultaneously or sequentially searching a term using the predefined select search preferences, thus allowing the user to access resources related to the term in much the same manner as a conventional link.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
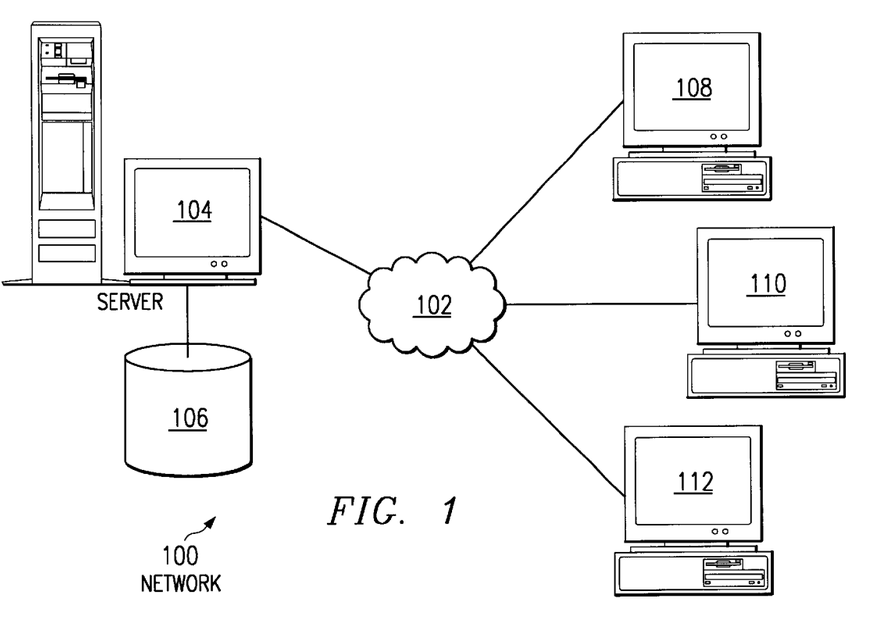
FIG. 1 depicts a distributed data processing system in which the present invention may be implemented.

With reference now to the figures, FIG. 1 depicts a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 and with storage 106 is connected to server 104. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108, 100 and 112. Clients 108, 110 and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
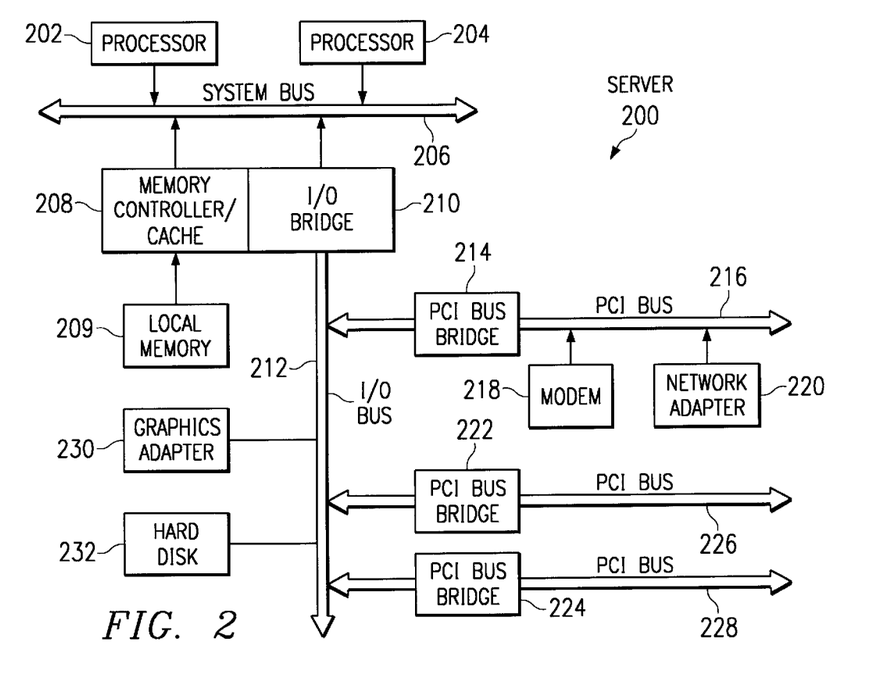
FIG. 2 is a block diagram illustrating a data processing system that may be implemented as a server in accordance with the present invention.

Referring to FIG. 2, a block diagram depicts a data processing system that may be implemented as a server, such as server 104 in FIG. 1, in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 or network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
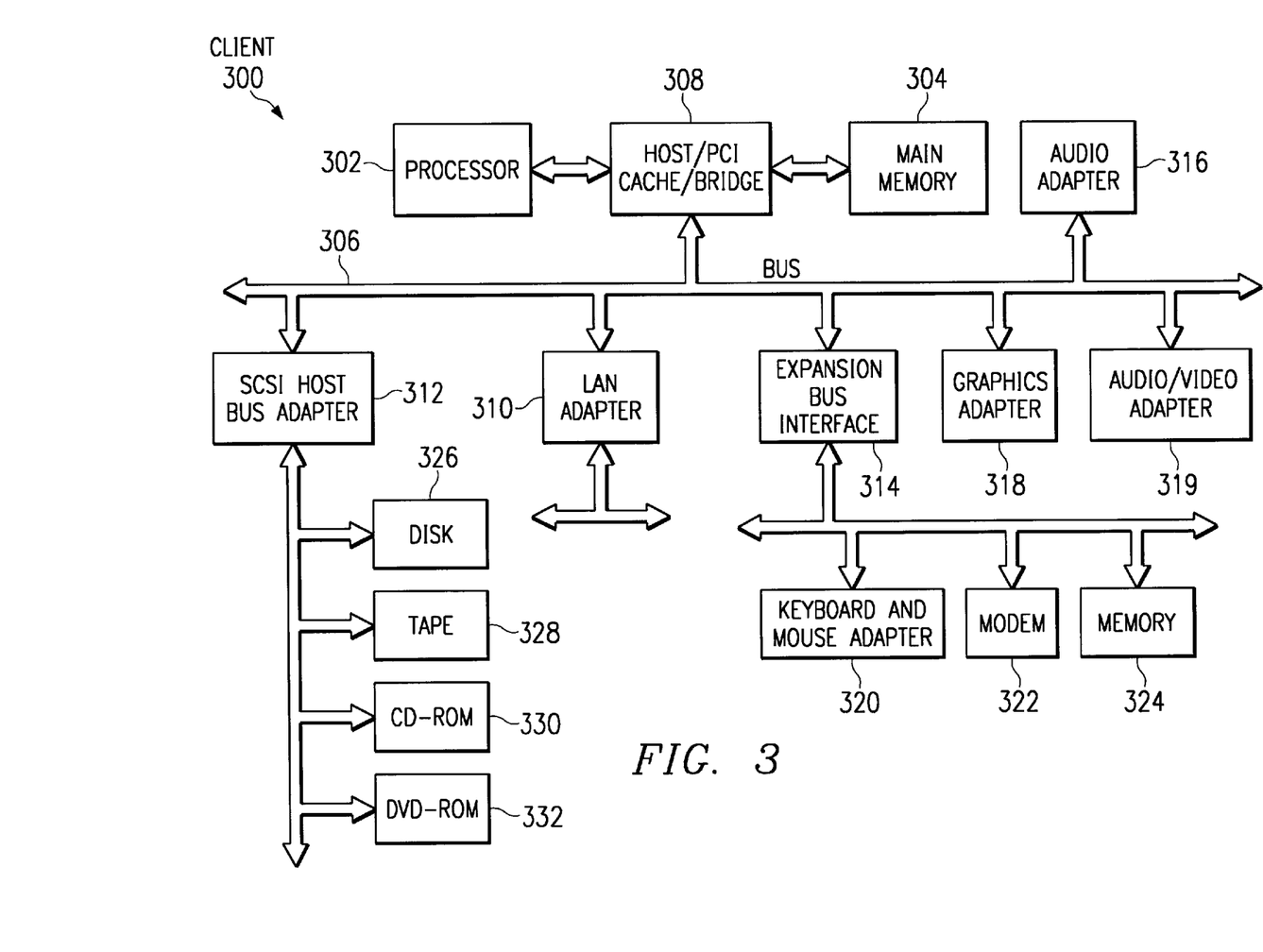
FIG. 3 is a block diagram illustrating a data processing system in which the present invention may be implemented.

With reference now to FIG. 3, a block diagram illustrates a data processing system that may be implemented as a client, such as client 108 in FIG. 1, in accordance with the present invention. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, CD-ROM 330, and DVD-ROM 332 as shown in FIG. 3. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

In any event, the above-described examples are not meant to imply architectural limitations.

The Internet, an example of an "internetwork," is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
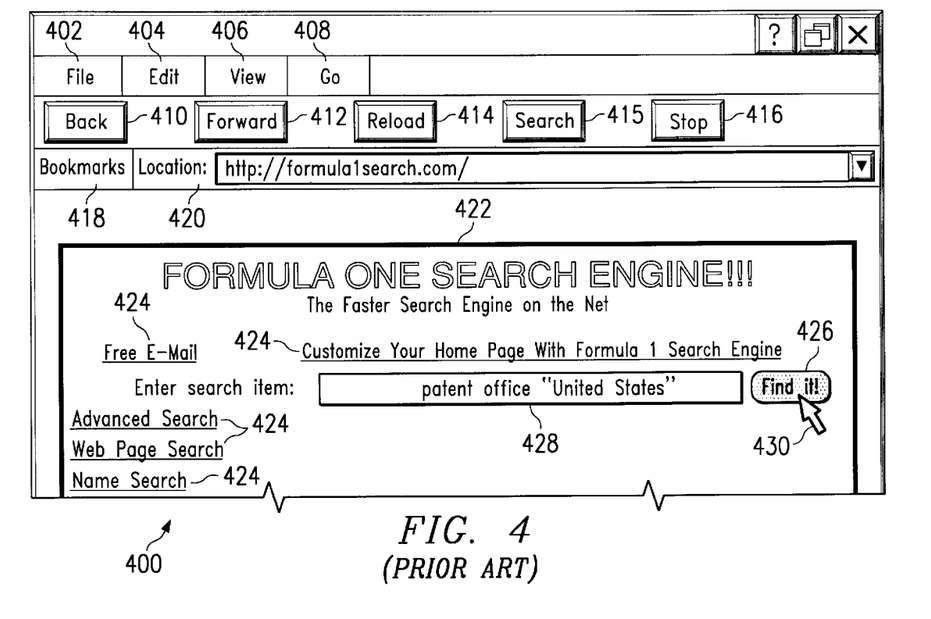
FIG. 4 illustrates a graphical user interface of a conventional browser.

FIG. 4 illustrates a graphical user interface of a conventional browser. Browser 400 may be used for implementing a preferred embodiment of the present invention. Browser 400 is an application that includes a graphical user interface, which allows a user to easily navigate through a node network, such as WWW. Essentially, browser 400 is a multi-function graphical user interface; but one of its most important functions is accessing web pages of a prescribed format, such as hypertext transfer protocol (HTTP). The graphical user interface of browser 400 consists of a number of menus, buttons, and text fields. Only the more important features of browser 400 are illustrated in this example. It is well known in the art that browsers consist of and are configured with many other features not shown in this example. File menus 402–406 are standard menu buttons on most application interfaces. By selecting file menu 402, the user exposes a pull-down menu, which may include such features as open page capabilities, saving, routing, printing, and closing functions. Edit menu 404 allows the user access to the browser's editing features, such as cut, paste and copy operations, find operations, and searching operations. Selecting edit menu 404 also normally exposes a preference option, which allows the user to select certain preferences or options associated with browser 400. View menu 406 allows the user to configure the graphical user interface of the browser, including hiding or viewing certain tool bars, navigators and buttons. Go menu 408, when pressed by the user, exposes a menu of navigation tools, such as forward, back, or home. By pressing the go button and selecting one of these features, the user navigates through a series of web pages or nodes which have recently been visited, or a home or start-up site, which is normally defined by the user in the preference selection of the edit button. Buttons 410–416 are also navigation buttons. In fact, the functions of button 410 and button 412 are normally found in the go button 408 menu. Reload button 414 allows the user to reload the currently viewed page, in case of an error in loading or for a page which is constantly being updated by the source and yet provides no automatic updating feature to the browser. Stop button 416 ends the loading process of the current web page with whatever portion of the page that has been loaded up to the time stop button 416 is initiated. Bookmarks button 418, when pressed by the user, exposes the bookmarks and edit tools needed to save and maintain a list of favorite web pages or network nodes identified by the user. Finally, location text field 420 allows the user to manually identify a web page by its unique address, allowing the browser to access the address identified in the text.

Browser 400 represents a means for implementing direct linked selection of cached, previously visited links in nested web pages. As a user visits a web page, such as Formula One Search Engine page 422, in the conventional manner, the user has available numerous hypertext links embedded on the web page from which to choose. Links 424 illustrate hypertext links that were created by the web page creator. The user can quickly navigate to the web pages associated with hypertext links 424 by merely clicking on hot spots associated with the hypertext links with pointer 430. Browser 400 then automatically navigates to the address of the web page associated with the hypertext link. In the example in FIG. 4, however, the user entered a text string in search text entry field 428, rather than jumping to another web page or manually addressing the web page in location entry field 420.

Figure 5:
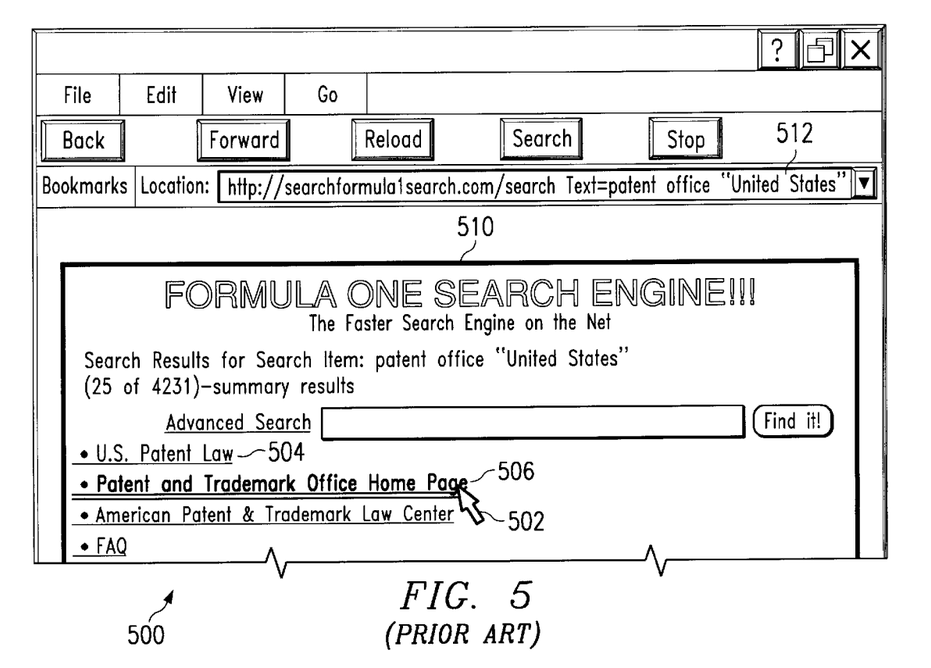
FIG. 5 illustrates a typical web page that might be expected as a result of the searching operation performed in FIG. 4.

FIG. 5 illustrates a typical web page that might be expected as a search result from the searching operation performed in FIG. 4. Web page 510 depicts the Formula One Search Engine Results page, which displays the search results obtained from the search request performed by the user in FIG. 4. Web page 510 also contains embedded hypertext links, as described above. In this case, U.S. Patent Law link 504 provides a hypertext link for the user to immediately access information about U.S. patent law. The next link, Patent and Trademark Office Home Page link 506, provides a means for the user to immediately access the U.S. Patent and Trademark Office home page. In this case, the user has manipulated pointer 502 over link 506 and activated the link. Activating a hypertext link usually entails clicking the mouse button, but may also be activated with the enter key or any another user interface for executing commands.

Note that link 506 differs in appearance from link 504 in that the characters of link 506 are bolder, and the underlining of the characters in link 506 is double rather than single. Conventionally, a user is directed to links on a web page by the color or font characteristics of the characters in the text of the link. Typically, hypertext links in a web page are displayed in a predetermined color shade that is different from normal text, indicating an active but unused hypertext link. After activation, or after the link has been accessed once, the color shade of the link changes to a second color, indicating to the user that the web page associated with the link has been selected or opened at least once. Thus, the user is provided an easy means to identify hypertext links on a web page and also discriminate links that have been used from those that have not been used.

Note also on browser 500 that location field entry 512 displays the address of web page 510. In the example depicted in FIG. 5, the user has positioned pointer 502 over link 506, which provides a link to the Patent and Trademark Office home page. By executing an enter command (clicking the pointer) with pointer 502 positioned over link 506, browser 500 will jump to or open the page identified by the link.

Figure 6:
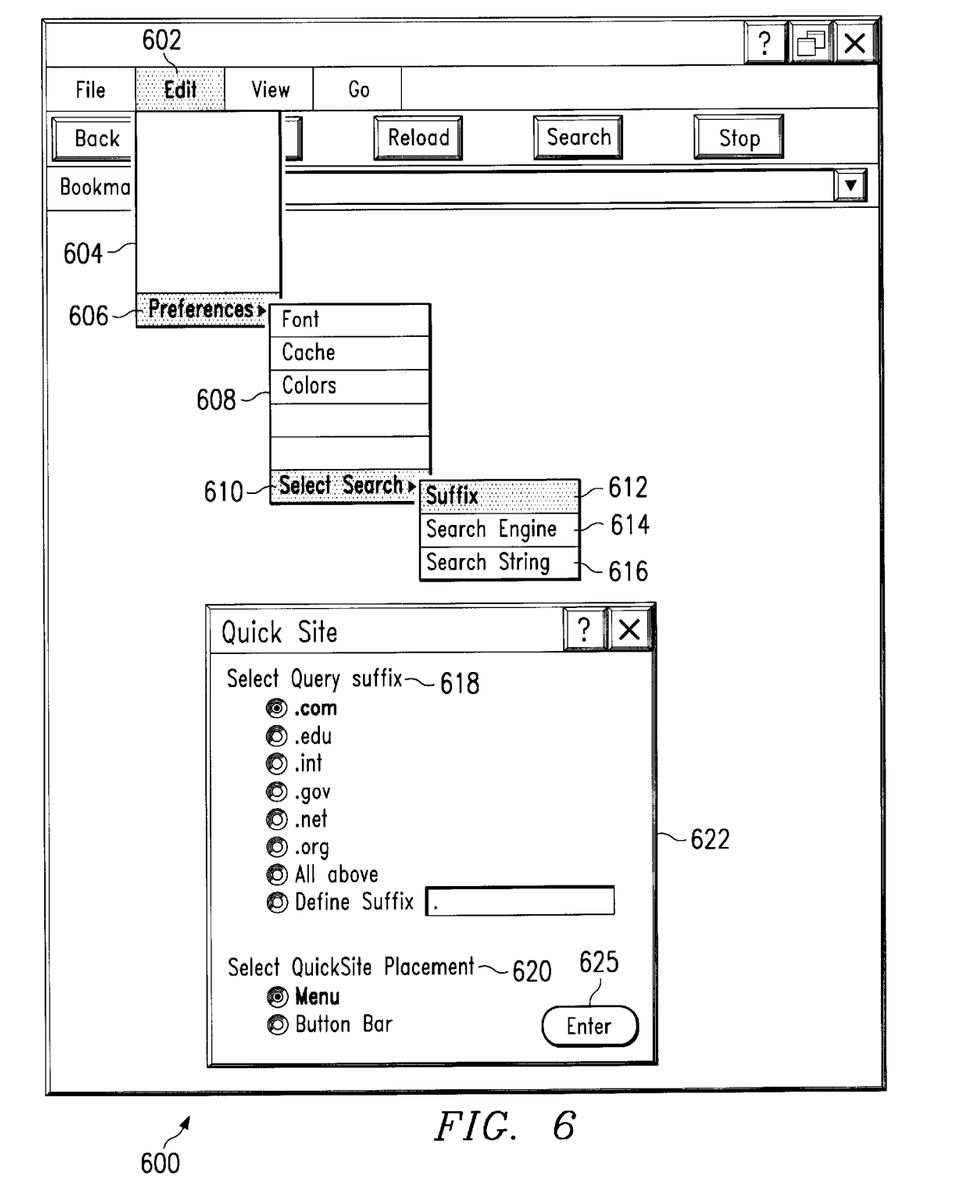
FIG. 6 illustrates a browser configured with a preferred embodiment of the present invention for setting suffix preferences related to a user defined select search tool.

FIG. 6 illustrates a browser configured with a preferred embodiment of the present invention for setting suffix preferences related to a user defined select search tool. Browser 600 is similar in many aspects to the browser described in FIG. 4. In the depicted example, the user has selected edit button 602, which exposes drop-down menu 604 comprising a series of edit functions, including preference item 606. The user has again made a selection, illustrated by the highlighted state of preferences item 606. The selection of preferences item 606 has exposed a second layer drop-down menu 608, which includes a plurality of preference options including font, cache, colors, and select search 610. Select search 610 is invoked by the user in order to define a search item within a search menu or to define a search button on browser 600 button bar. In this case, the user has invoked select search item 610, exposing three options for configuring a select search tool.

In a preferred embodiment of the present invention, the select search tool may be configured in one of three ways. The first is by configuring suffix search selections using suffix option item 612. The second is by defining search engine strategy using search engine option item 614 in browser 600. The final method is by defining a search string strategy using search string option item 616, also as depicted in browser 600. Clearly, other possible methods for defining a user search may be implemented, or combinations of the above may be used for defining a select search tool. In the depicted example, however, the user selected suffix option item 612, which has opened QuickSite dialog box 622.

QuickSite dialog box 622 is used for entering specific preference options related to the suffix search. QuickSite dialog box 622 is roughly divided up into two options. The first option is query suffix options 618, and the second is QuickSite placement options 620. Initially, the user is provided with a list of query suffix options for known universal resource locator (URL) extensions. The most common of these are .com, .edu, .int, .gov, .net, and .org. The user may select one or all of the URL extensions. Additionally, the user is provided with a menu option for selecting all of the above URL extensions, as well as a dialog box for defining suffixes not listed or to be created in the future.

QuickSite placement option 620 provides the user with a means for placing the select search tool on browser 600. In one embodiment of the present invention, the user defined select search tools are placed in an expansion menu of an existing search button. In another option, the user defined select search tools are placed on the tool bar of browser 600 as individual QuickSite buttons or icons. After the user chooses the selection options, the user enters the selection options into the browser preferences by hitting enter button 625.

Figure 7:
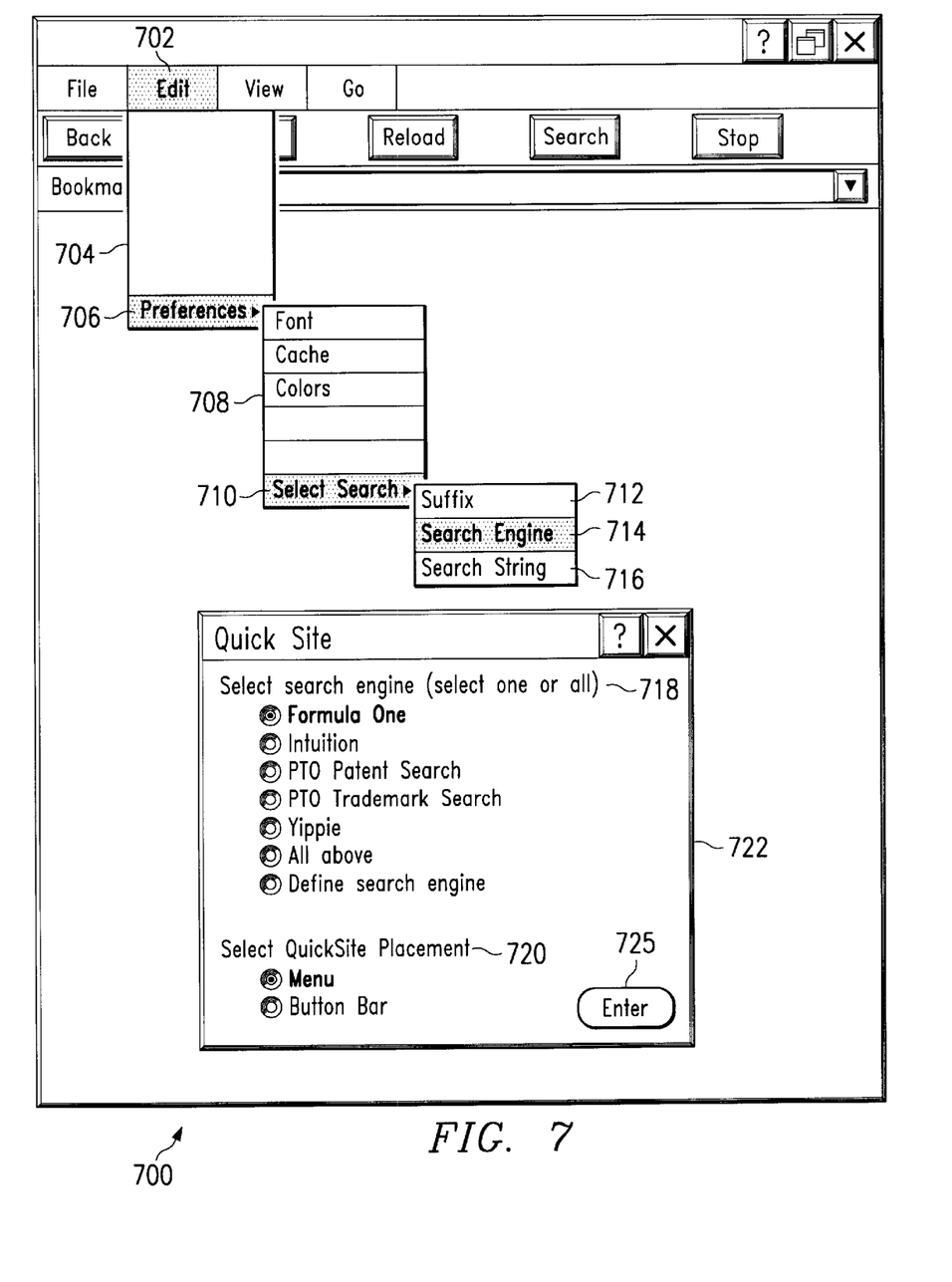
FIG. 7 illustrates a browser configured with a preferred embodiment of the present invention for setting search engine preferences related to a user defined select search tool.

FIG. 7 illustrates a browser configured with a preferred embodiment of the present invention for setting search engine preferences related to a user defined select search tool. This illustration depicts that browser 700 is similar to browser 600 in that the user has selected edit item 702, expanding drop-down menu 704; and the user has further selected preferences item 706. The selection of preferences item 706 has exposed second layer drop-down menu 708, and the user has further selected select search item 710, exposing suffix option item 712, search engine item 714, and search string item 716.

In the depicted example, the user has selected search engine option item 714, exposing QuickSite dialog box 722. In this example, QuickSite dialog box 722 provides the user with a series of search engine options 718, and QuickSite placement options 720. In the depicted example, search engine options 718 include such famous search engines as the 'Formula One' engine, 'Intuition' engine, 'PTO Patent Search' engine, 'PTO Trademark Search' engine, and 'Yippie' engine. Each of the above mentioned search engines may be selected separately or in combination with any other search engine listed. Additionally, the user is provided with a means for selecting all the search engines provided or for defining additional search engines not provided in search engine options 718.

QuickSite placement option 720 provides the user with a means for placing the select search tool on browser 700. In one embodiment of the present invention, the user defined select search tools are placed in an expansion menu of an existing search button. In another option, the user defined select search tools are placed on the tool bar of browser 700 as individual QuickSite buttons. After the user chooses the selection options, the user enters the selection options into the browser preferences by hitting enter button 725.

Figure 8:
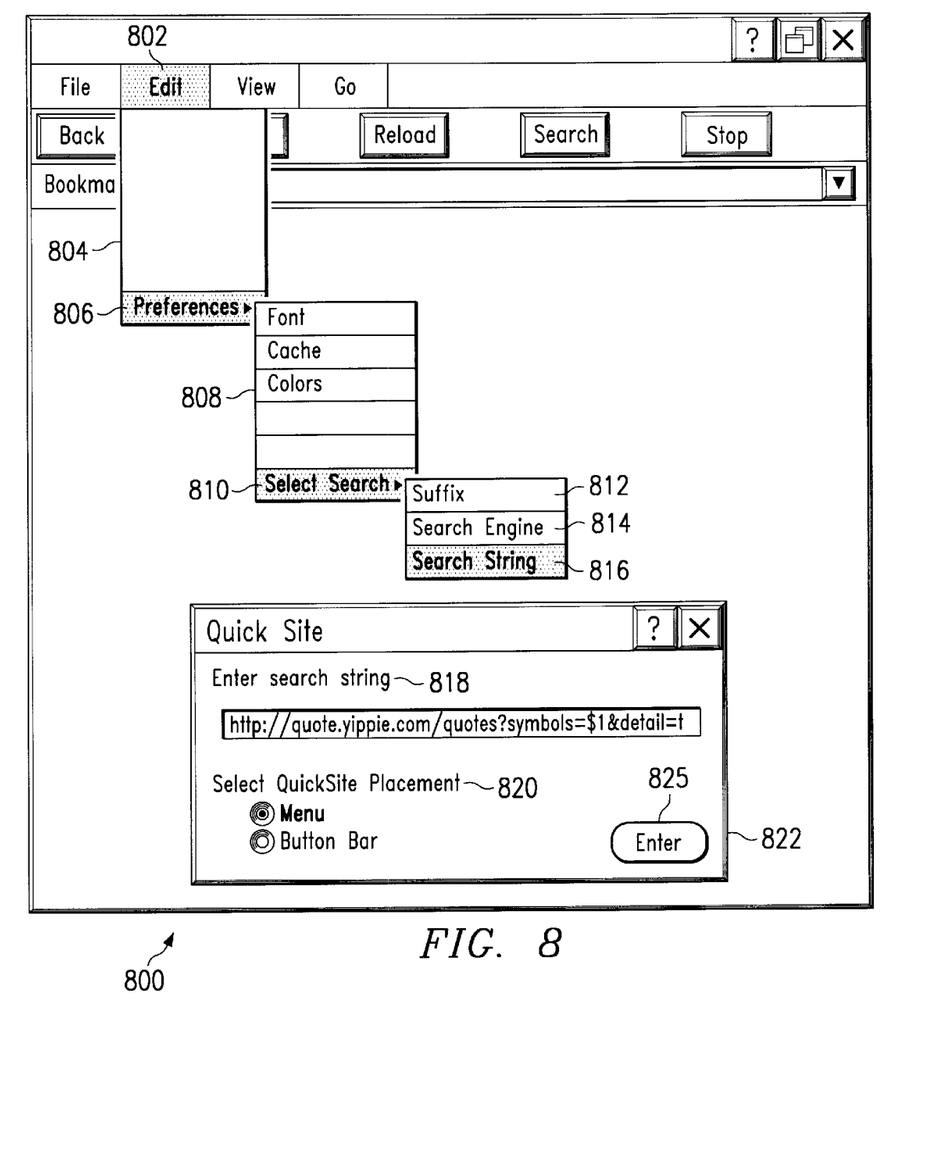
FIG. 8 illustrates a browser configured with a preferred embodiment of the present invention for setting search string preferences related to a user defined select search tool.

FIG. 8 illustrates a browser configured with a preferred embodiment of the present invention for setting search string preferences related to a user defined select search tool. This illustration depicts that browser 800 is similar to both browser 600 and browser 700 in that the user has selected edit item 802, expanding drop-down menu 804, and the user has further selected preferences item 806. The selection of preferences item 806 has exposed second layer drop-down menu 808, and the user has further selected select search item 810, exposing suffix option item 812, search engine item 814, and search string item 816.

In the depicted example, the user has selected search string option 816, which has caused QuickSite dialog box 822 to open in the browser viewing area. QuickSite dialog box 822 is roughly divided into two sections. The first section contains search string option entry area 818, and the second contains QuickSite placement options 820.

In the depicted example, the user has entered a search string in search string entry area 818. Here, the user search will access the Yippie site for stock and commodity quotes related to a search term. In the depicted example, the user has created a search string of hftp://quote yippie.com/quotes?symbols=$1&detail=t. QuickSite placement option 820 provides the user with a means for placing the select search tool on browser 800.

In one embodiment of the present invention, the user defined select search tools are placed in an expansion menu of an existing search button. In another option, the user defined select search tools are placed on the tool bar of browser 800 as individual QuickSite buttons or icons. After the user chooses the selection options, the user enters the selection options into the browser preferences by hitting enter button 825.

Figure 9:
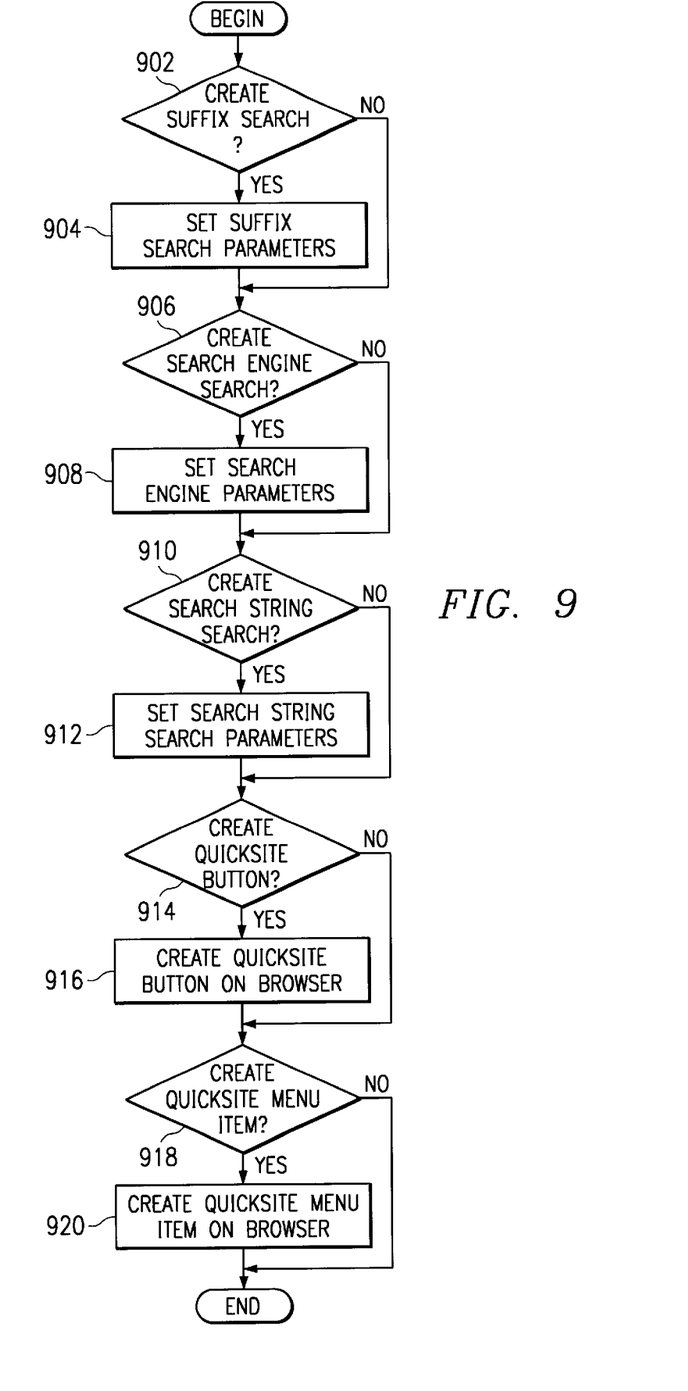
FIG. 9 is a flowchart depicting the process of setting select search preferences in a web browser.

FIG. 9 is a flowchart depicting the process of setting select search preferences in a web browser. The process is a hierarchical flow of determinations as to whether an event is to take place and, once that determination has been made, allowing the event to proceed. The process begins at step 902, where it is determined whether the user intends to create a suffix search. If the user intends to create a suffix search, the suffix search parameters are entered (step 904), as discussed above with reference to FIG. 6. The process then flows to decision step 906. In the event the user does not intend to create a suffix search, the process flows directly to step 906.

Next, a determination is made as to whether the user intends to create a search engine search (step 906). If the user intends to create a search engine search, search engine parameters are entered (step 908), as depicted above in FIG. 7. The process then flows to decision step 910. If the user does not intend to create a search engine search, the process flows directly from step 906 to decision step 910.

At decision 910, a determination is made as to whether a search string search is to be created. If the user intends to create a search string search, the search string search parameters are entered at step 912, as described above with respect to FIG. 8. The process then flows to decision step 914. If the user does not intend to create a search string search, the process flows directly from decision step 910 to decision step 914.

At step 914, the determination is made as to whether the above-defined select search parameters will be applied to define a QuickSite button. If the user intends to create a QuickSite button from any or all of the preferences defined above, a QuickSite button is created on the browser (step 916). The process then flows to decision 918. If, on the other hand, the user does not intend to create a QuickSite button, the process flows directly from decision 914 to decision 918.

At decision 918, a determination is made as to whether a QuickSite menu item should be added to a search button. If the user intends to create a drop-down menu on the search button, including one or all of the above-defined select search options, the QuickSite menu item is created for a search button on the browser (step 920). The process then ends. If the user does not intend to create a QuickSite menu item or button on a browser, the process ends directly after decision step 918.

Figure 10:
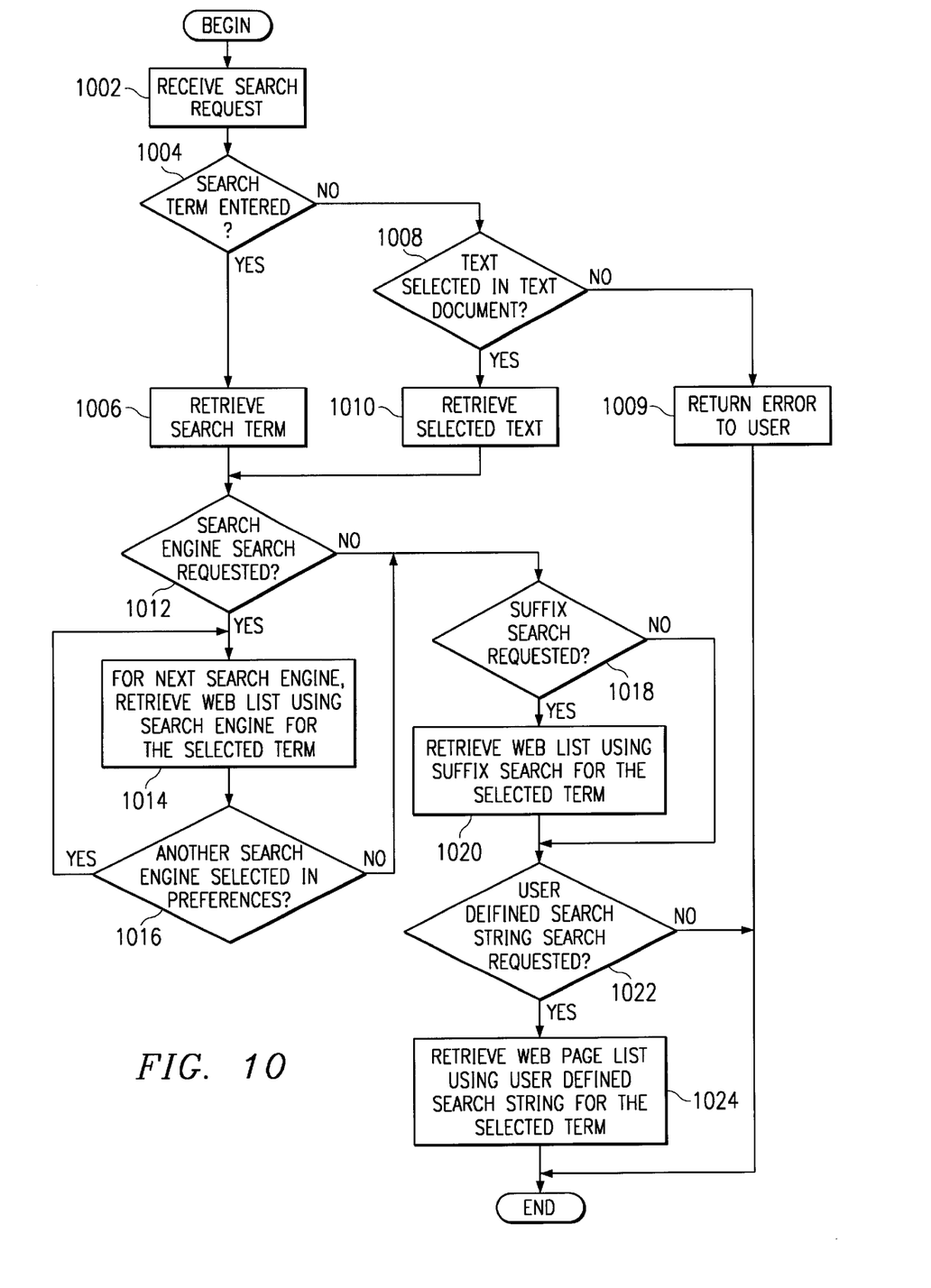
FIG. 10 is a flowchart illustrating a browser implemented process for using the select search tool in accordance with a preferred embodiment of the present invention.

FIG. 10 is a flowchart illustrating a browser implemented process for using the select search tool in accordance with a preferred embodiment of the present invention. The process begins with the browser receiving a search request (step 1002). A determination is then made as to whether a search term has been encountered (step 1004). As with a conventional search engine, the select search tool provides a search term entry box for entering a term to be searched. If the browser detects that the user has entered a term in the search term entry box, the browser retrieves the search term found in the entry box over any text that may be selected in the document found within the viewing area of the browser (step 1006). The process then flows to decision step 1012.

Returning to decision step 1004, if no search term is found in the menu entry box, the browser then looks to the document in the viewing area for a user-selected word or phrase (step 1008). If no selected text can be found in the document in the viewing area, an error is returned to the user requesting a search term or phrase (step 1009). If, on the other hand, the browser detects selected text within the document body, the browser retrieves the selected text (step 1010), and the process flows to decision step 1012.

As discussed above, the search selection options may be invoked separately or simultaneously. At decision 1012, a determination is made as to whether a search engine search has been requested by the user. If a search engine search has not been requested by the user, the process flows directly to decision step 1018. If a search engine search has been requested by the user, the browser selects the next search engine from the search engine preferences and, using the next search engine, retrieves a list of web pages which includes the selected search terms (step 1014).

Next, a determination is made as to whether another search engine has been selected in the user defined preferences (step 1016). If another search engine has been selected in the user defined preferences, the process returns to step 1014 where, for the next search engine selected in the preferences, a list of web pages including the selected terms is retrieved. The process again flows to decision 1016 and iterates between decision step 1016 and step 1014 until no other search engines remain in user defined preferences.

At this point, the process flows to decision step 1018, where a determination is made as to whether a suffix search has been requested by the user for specific URL extensions. If a suffix search has not been requested, the process flows to step 1022. If a suffix search has been requested, the select search tool retrieves a list of the web pages which includes the suffixes selected in the user defined preferences (step 1020). The process then flows to step 1022, where a determination is made as to whether a user defined search string search has been requested. If no user defined search string search has been requested, the process ends. If, on the other hand, a user defined search string search has been requested, the select search tool retrieves a list of web pages including the search string results for the selected term (step 1024). The process then ends.

Figure 11:
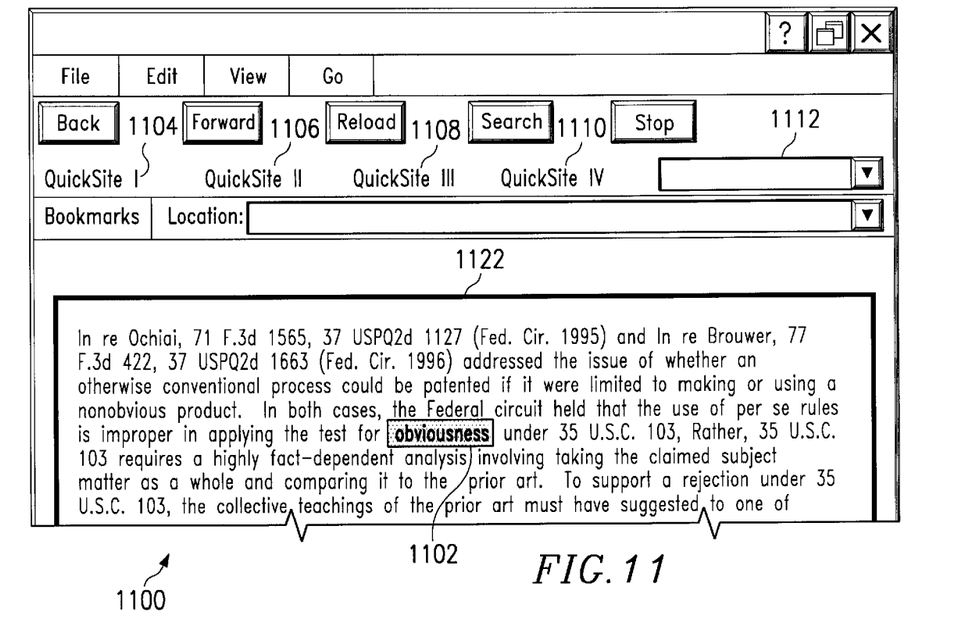
FIG. 11 illustrates a web browser containing a select search tool in accordance with one embodiment of the present invention.

FIG. 11 illustrates a web browser containing a select search tool in accordance with one embodiment of the present invention. FIG. 11 illustrates the configuration of a graphical user interface associated with web browser 1100. The graphical user interface associated with web browser 1100 is similar in many aspects to a conventional graphical user interface, such as that available in web browser 400, with the exception of the select search tool features. These features include a series of QuickSite buttons 1104, 1106, 1108 and 1110. Additionally, a search term entry box 1112 is provided on the browser menu bar for the user to enter search terms.

In the depicted example, browser content area 1122 contains a passage from the Manual of Patent Examination Procedures (MPEP). The word "obviousness" 1102 has been selected by the user in a conventional manner using a mouse, keypad, or some other device. As indicated by italicized highlighting in the illustration, the user has selected Quick-Site I button 1104, QuickSite II button 1106, and QuickSite III button 1108, representing selection tool options which have been previously defined by the user and placed on the browser menu in accordance with the process described above. Thus, as depicted in the example using browser 1100, the user intends to simultaneously perform three user defined searches for the search term "obviousness" 1102.

Figure 12:
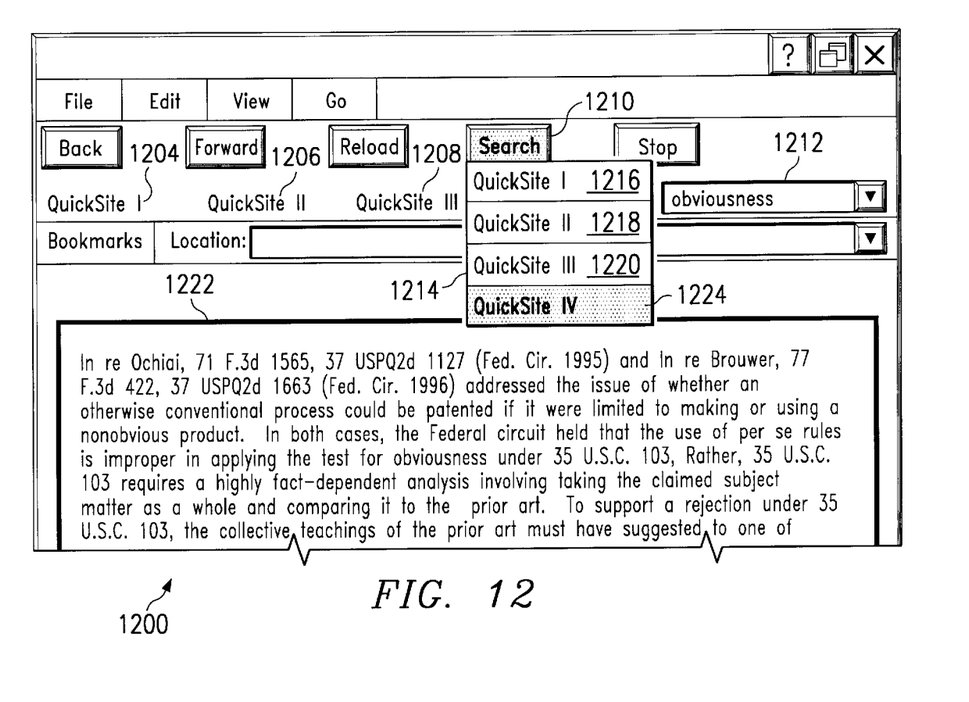
FIG. 12 illustrates a web browser containing a select search tool in accordance with an alternative embodiment of the present invention.

FIG. 12 illustrates a web browser containing a select search tools in accordance with an alternative embodiment of the present invention. The graphical user interface of browser 1200 is similar to the graphical user interface of browser 1100. However, browser 1200 depicts the search button menu item options of the select search tool.

Note that browser 1200 contains QuickSite search buttons 1204, 1206 and 1208, which are identical to those in browser 1100. However, in the depicted example, rather than identifying the search term in content area 1222 of the web browser, the user has instead entered the search term "obviousness" in search term dialog box 1212. In further deference to the example described above, the user has selected the select search tool from search button 1210, which exposes drop-down menu 1214, including select search tools which are identical to those available as buttons or icons on the button bar of browser 1100.

Drop-down menu 1214 includes search select tools QuickSite I item 1216, QuickSite II item 1218, QuickSite III item 1220, and QuickSite IV item 1224. The user has selected QuickSite IV item 1224 from drop-down menu 1214, indicating that the user desires to search the term "obviousness" entered in search term entry box 1212 using the select search tool defined as QuickSite IV. The select search tool will respond by returning a list of web pages. Thus, as depicted in the example using browser 1200, the user intends to perform a user defined search for the search term "obviousness."

In another example, suppose content area 1222 contained the partial phrase "Contenders for the prize include IBM, Microsoft and . . . " and the author has not provided any links to the text. QuickSite I search button 1204 is enabled to do a QuickSite search with the suffix ".com"; QuickSite II search button 1206, is enabled to do a QuickSite search through an on-line news service; and QuickSite III search button 1208 is enabled to do a QuickSite search with the string "http://quote.yahoo.com/quotes?symbols=$1&detailed=t". By manually selecting or highlighting the text "IBM" in the phrase and pressing each of the Quicksite buttons, the user would be presented with: the web page "www.IBM.com" in response to executing QuickSite I search button 1204; a page showing recent news items about the IBM Corporation in response to executing QuickSite II search button 1206; and a stock quote and chart of the recent performance of IBM stock in response to executing Quick-Site III search button 1208

Similarly menu items QuickSite I item 1216, QuickSite II item 1218, and QuickSite III item 1220 might be enabled identically to QuickSite I search button 1204, QuickSite II search button 1206, and QuickSite III respectively. When the user then selects the text "IBM" and selects each of the Quicksite menu items, the user is again presented with: the web page "www.IBM.com" in response to selecting Quick-Site I item 1216; a page showing recent news items about the IBM Corporation in response to selecting QuickSite II item 1218; and a stock quote and chart of the recent performance of IBM stock in response to selecting QuickSite III item 1220.

While, up to this point, the preferred embodiments describing the present invention have all related to a browser, the functionality defining a browser, i.e., program for reading hypertext, is not necessary for implementing the present invention. In other embodiments of the present invention, any document viewer may be improved by providing a search selection tool. The present invention allows the user to effectively create pseudo links to a selected term by searching a term using the predefined select search preferences and thus allowing the user to access resources related to the term in much the same manner as a conventional link. Searching may be performed nearly simultaneously with or sequentially among different search selection tools.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as floppy discs, hard disk drives, RAM, CD-ROMs, and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. This embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing implemented method for implementing a search selection tool, comprising:
   receiving a user defined search selection preference;
   incorporating the user defined search selection preference in a search selection tool; and
   associating the search selection tool with a browser by generating a search selection tool interface, wherein the user defined search selection preference relates to a universal resource locator extension.

2. The method recited in claim 1, further comprising:
   selecting a search term;
   selecting the search selection tool to be applied to the search term by selecting the search selection tool interface; and creating a list of resources based on the application of the search selection tool to the selected search term.

3. The method recited in claim 1, wherein the user defined search selection preference relates to a search engine search.

4. The method recited in claim 1, wherein the search selection tool interface is one of a search selection tool button, a search selection tool entry in a search menu, and a search selection icon on the browser.

5. The method recited in claim 1, wherein the user defined search selection preference relates to a user defined search string.

6. A data processing system for implementing a search selection tool, comprising:

receiving means for receiving a user defined search selection preference;

incorporating means for incorporating the user defined search selection preference in a search selection tool; and associating means for associating the search selection tool with a browser by generating a search selection tool interface, wherein the user defined search selection preference relates to a universal resource locator extension.

7. The system recited in claim 6, further comprising:

selecting means for selecting a search term;

selecting means for selecting the search selection tool to be applied to the search term by selecting the search selection tool interface; and creating means for creating a list of resources based on the application of the search selection tool to the selected search term.

8. The system recited in claim 6, wherein the user defined search selection preference relates to a search engine search.

9. The system recited in claim 6, wherein the search selection tool interface is one of a search selection tool button, a search selection tool entry in a search menu, and a search selection icon on the browser.

10. The system recited in claim 6, wherein the user defined search selection preference relates to a user defined search string.

11. A computer program product for implementing a search selection tool, comprising:

receiving instructions for receiving a user defined search selection preference;

incorporating instructions for incorporating the user defined search selection preference in a search selection tool; and associating instructions for associating the search selection tool with a browser by generating a search selection tool interface, wherein the user defined search selection preference relates to a universal resource locator extension.

12. A computer program product for implementing a search selection tool, comprising:

receiving instructions for receiving a user defined search selection preference;

incorporating instructions for incorporating the user defined search selection preference in a search selection tool;

associating instructions for associating the search selection tool with a document viewer;

viewing a document with the document viewer;

selecting instructions for selecting a term in the document; and performing instructions for performing a user defined search on the selected term using the search selection tool associated with a browser, wherein the associating instructions associate the search selection tool with the document viewer by generating a search selection tool interface, wherein the user defined search selection preference relates to a universal resource locator extension.

13. A method of searching information sources comprising:

receiving a selection of a search term;

receiving a selection of at least one universal resource locator extension; and performing a search of information sources to retrieve information sources that include the search term and that have a universal resource locator that includes the selected at least one universal resource locator extension.

14. The method of claim 13, wherein receiving a selection of at least one universal resource locator extension includes receiving a selection of a predefined search selection tool in a browser application.

15. The method of claim 14, wherein the predefined search selection tool is identified in the browser application by one of a virtual button, a menu entry, and an icon on the browser.

* * * * *